US00RE50259E

(19) United States
(12) Reissued Patent
Lethellier

(10) Patent Number: US RE50,259 E
(45) Date of Reissued Patent: Jan. 7, 2025

(54) BI-PLANE WIRELESS POWER TRANSMISSION PAD

(71) Applicant: Wireless Advanced Vehicle Electrification, LLC, Salt Lake City, UT (US)

(72) Inventor: Patrice Lethellier, Salt Lake City, UT (US)

(73) Assignee: Wireless Advanced Vehicle Electrification, LLC, Salt Lake City, UT (US)

(21) Appl. No.: 17/570,935

(22) Filed: Jan. 7, 2022

Related U.S. Patent Documents

Reissue of:
(64) Patent No.: 10,530,178
Issued: Jan. 7, 2020
Appl. No.: 15/456,402
Filed: Mar. 10, 2017

U.S. Applications:
(60) Provisional application No. 62/321,656, filed on Apr. 12, 2016, provisional application No. 62/321,647,
(Continued)

(51) Int. Cl.
*H02J 50/90* (2016.01)
*B60L 53/12* (2019.01)
(Continued)

(52) U.S. Cl.
CPC ..... *B60L 53/12* (2019.02); *B60L 53/34* (2019.02); *B60L 53/39* (2019.02); *H01F 3/10* (2013.01);
(Continued)

(58) Field of Classification Search
CPC .... H02J 7/02; H02J 7/025; H02J 50/10; H02J 50/12; H02J 50/70; H02J 50/90;
(Continued)

(56) References Cited

U.S. PATENT DOCUMENTS 9,071,061 B2 * 6/2015 Boys ..... H04B 5/0037
9,837,204 B2 * 12/2017 Widmer ..... H01F 38/14
(Continued)

FOREIGN PATENT DOCUMENTS

RU 2505919 1/2014
RU 2505919 C1 1/2014
(Continued)

OTHER PUBLICATIONS

Professor J T Boys and Professor G A Covic, IPT Fact Sheet Series: No. 1—Basic Concepts, The University of Auckland, 2013.
(Continued)

*Primary Examiner* — My Trang Ton
(74) *Attorney, Agent, or Firm* — Kunzler Bean & Adamson; Bruce R. Needham

(57) ABSTRACT

An apparatus includes a first charging coil with one or more conductors arranged in a first winding pattern, a second charging coil with one or more conductors arranged in a second winding pattern, and a ferrite structure with a main section with a top side, a first side section and a second side section. A portion of the top side of the main section is adjacent to a portion of the bottom side of the first side section and the second side section. A portion of the first and second charging coils are positioned adjacent to the top side of the main section interior in between the first and second side sections. A portion of the first charging coil is adjacent to the bottom of the first side section. A portion of the second charging coil is adjacent to the bottom of the second side section.

30 Claims, 9 Drawing Sheets

Related U.S. Application Data filed on Apr. 12, 2016, provisional application No. 62/306,426, filed on Mar. 10, 2016.

(51) Int. Cl.

| | |
|---|---|
| ***B60L 53/34*** | (2019.01) |
| ***B60L 53/39*** | (2019.01) |
| ***H01F 3/08*** | (2006.01) |
| ***H01F 3/10*** | (2006.01) |
| ***H01F 17/00*** | (2006.01) |
| ***H01F 27/38*** | (2006.01) |
| ***H01F 38/14*** | (2006.01) |
| ***H02J 50/10*** | (2016.01) |
| ***H02J 50/12*** | (2016.01) |
| ***H02J 50/70*** | (2016.01) |

(52) U.S. Cl.

CPC ..... *H01F 27/38* (2013.01); *H01F 38/14* (2013.01); *H02J 50/10* (2016.02); *H02J 50/70* (2016.02); *H02J 50/90* (2016.02); *H01F 3/08* (2013.01); *H01F 2017/0066* (2013.01); *H01F 2017/0073* (2013.01); *H02J 50/12* (2016.02); *Y02T 10/70* (2013.01); *Y02T 10/7072* (2013.01); *Y02T 90/12* (2013.01); *Y02T 90/14* (2013.01)

(58) Field of Classification Search

CPC ..... B60L 53/12; B60L 53/34; B60L 53/39; B60L 11/182; H01F 3/08; H01F 3/10; H01F 17/00; H01F 27/38; H01F 38/14; H01F 2017/0066; H01F 2017/0073; Y02T 10/7005; Y02T 10/7088; Y02T 90/121; Y02T 90/122; Y02T 90/125; Y02T 90/14

USPC ..... 320/107–109

See application file for complete search history.

(56) References Cited

U.S. PATENT DOCUMENTS

| | | | | |
|---|---|---|---|---|
| 9,954,387 | B2 * | 4/2018 | Sultenfuss | H02J 7/025 |
| 10,014,104 | B2 * | 7/2018 | Widmer | H02J 7/00034 |
| 10,553,351 | B2 * | 2/2020 | Jitaru | H01F 27/24 |
| 2008/0129246 | A1 | 6/2008 | Morita et al. | |
| 2013/0033351 | A1 | 2/2013 | Kim et al. | |
| 2013/0214735 | A1 | 8/2013 | Kang et al. | |
| 2013/0270921 | A1 | 10/2013 | Boys et al. | |
| 2014/0327391 | A1 | 11/2014 | Niederhauser et al. | |
| 2015/0077053 | A1 | 3/2015 | Stamenic et al. | |
| 2015/0170833 | A1 | 6/2015 | Widmer et al. | |
| 2015/0364929 | A1 | 12/2015 | Davis et al. | |

FOREIGN PATENT DOCUMENTS

| | | | | |
|---|---|---|---|---|
| WO | 2012018268 | | 2/2012 | |
| WO | 2012018268 | A1 | 2/2012 | |
| WO | WO-2017093255 | A1 * | 6/2017 | H01F 38/14 |

OTHER PUBLICATIONS

International Application No. PCT/US17/21971, filed Mar. 10, 2017, International Search Report and Written Opinion, dated Aug. 14, 2017.

* cited by examiner

BI-PLANE WIRELESS POWER TRANSMISSION PAD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCES TO RELATED APPLICATIONS

*This application is a reissue of U.S. application Ser. No. 15/456,402, which is incorporated by reference for all purposes.*

This application claims the benefit of U.S. Provisional Patent Application No. 62/306,426 entitled "BI-PLANE WIRELESS POWER TRANSMISSION PAD" and filed on Mar. 10, 2016 for Patrice Lethellier, U.S. Provisional Patent Application No. 62/321,647 entitled "WIRELESS POWER TRANSMISSION PAD WITH MAGNETIC SHARING LINK" and filed on Apr. 12, 2016 for Patrice Lethellier, and U.S. Provisional Patent Application No. 62/321,656 entitled "WIRELESS POWER TRANSMISSION PAD WITH WIRED SHARING LINK" and filed on Apr. 12, 2016 for Patrice Lethellier, which are all incorporated herein by reference.

FIELD

This invention relates to wireless power transfer and more particularly relates to a bi-plane wireless power transfer pad.

BACKGROUND

Wireless power transfer provides a means to direct power across an airgap so that power is transferred from a primary pad to a secondary pad without wired connections. Wireless power transfer is used for providing power to vehicles where a vehicle with a secondary pad may be positioned over a primary pad so that power can be transferred to the vehicle for battery charging or other purposes. Wireless power transfer may also be used to provide power to other items, such as consumer electronics, cellular telephones, etc.

Primary and secondary pads may include ferrite materials in a specific shape and may include charging coils in a particular pattern and shape to shape an electromagnetic field between the pads to increase efficiency and minimize electromagnetic field leakage.

SUMMARY

An apparatus for a bi-plane wireless power transmission pad is disclosed. An alternate apparatus and a system of the apparatus. The apparatus includes a first charging coil with one or more conductors arranged in a first winding pattern and a second charging coil with one or more conductors arranged in a second winding pattern. The apparatus includes a ferrite structure with a main section with a top side, a first side section and a second side section. The first side section and the second side section each include a bottom side where a portion of the top side of the main section is adjacent to a portion of the bottom side of the first side section and the second side section. A portion of the first charging coil and a portion of the second charging coil are positioned adjacent to the top side of the main section interior to where the first side section and the second side section are adjacent to the top side of the main section. A portion of the first charging coil is adjacent to the bottom side of the first side section and a portion of the second charging coil is adjacent to the bottom side of the second side section.

In one embodiment, the main section is magnetically coupled to the first side section and to the second side section. In another embodiment, the apparatus includes a space between the portion of the first charging coil and the portion of the second charging coil located adjacent to the top side of the main section. In another embodiment, the main section, the first side section and the second side section of the ferrite structure are separate and the top side of the main section is in contact with the bottom side of to the first side section and with the bottom side of the second side section. In another embodiment, the portion of the first charging coil and the portion of the second charging coil adjacent to the top side of the main section are wound in a spiral pattern in a plane parallel to the top side of the main section.

In one embodiment, the ferrite structure has a first edge and a second edge, where the first and second edge are located distal to a plane bisecting the main section, the first side section and the second side section, the first charging coil and the second charging coil extend past the first and second edges of the ferrite structure. In another embodiment, the ferrite structure includes a plurality of notches, where each notch accommodates a portion of one of the first charging coil and the second charging coil during a transition between the main section and one of the first side section and the second side section. In another embodiment, the main section is joined to the first side section and the second side section.

In one embodiment, the portion of the first charging coil adjacent to the bottom side of the first side section is wound to group the one or more conductors in a pattern that minimizes conductor length and/or distance from a center point of the main section between the first charging coil and the second charging coil. In another embodiment, the one or more conductors of the first charging coil and the one or more conductors of the second charging coil each include two coils wound in a parallel pattern where a first coil of a charging coil of the first or second charging coils is wound adjacent to a second coil of the charging coil. In another embodiment, each of the one or more conductors of the first charging coil and the second charging coil are stacked in layers over the main section. Each layer is in a plane parallel to the top side of the main section.

In one embodiment, the first and second charging coils and the ferrite structure include a first pad section and the apparatus includes a second pad section. The second pad section has two or more additional charging coils and an additional ferrite structure arranged the same as the first pad section, where the first pad section and the second pad section are arranged to form a charging pad. In another embodiment, the apparatus is part of a primary pad of a wireless power transfer system and the apparatus includes an inverter connected to the first and second charging coils. The inverter injects a signal in the first and second charging coils, where the injected signal generates an electromagnetic field radiating in a direction away from the top side of the main section. In a further embodiment, the apparatus includes a secondary pad magnetically coupled to the primary pad. The secondary pad converts energy from the electromagnetic field into electrical energy. The apparatus also includes a secondary circuit connected to the secondary pad, where the secondary pad receives the electrical energy from the secondary pad and conditions the electrical energy for use by a load.

An alternate apparatus includes a first charging coil with one or more conductors arranged in a first winding pattern and a second charging coil with one or more conductors arranged in a second winding pattern. The apparatus includes a ferrite structure with a main section with a top side, a first side section and a second side section. The first side section and the second side section each have a bottom side, and the main section is magnetically coupled to the first side section and to the second side section. The ferrite structure is multi-level and the bottom side of the main section is offset from the bottom side of the first side section and from the second side section. A portion of the first charging coil and a portion of the second charging coil are positioned adjacent to the top side of the main section interior to where the first side section and the second side section are adjacent to the top side of the main section. A portion of the first charging coil is adjacent to the bottom side of the first side section and a portion of the second charging coil is adjacent to the bottom side of the second side section.

In one embodiment, the offset is at least a thickness of the first charging coil and/or the second charging coil. The thickness is measured in a direction perpendicular to the bottom side of the first side section and/or the second side section. In another embodiment, the portion of the first charging coil and the portion of the second charging coil adjacent to the top side of the main section are wound in a spiral pattern in a plane parallel to the top side of the main section. In another embodiment, the ferrite structure has a first edge and a second edge. The first and second edges located distal to a plane bisecting the main section, the first side section and the second side section. The first charging coil and the second charging coil extend past the first and second edges of the ferrite structure.

A system for wireless power transfer includes a first charging coil with one or more conductors arranged in a first winding pattern and a second charging coil with one or more conductors arranged in a second winding pattern. The system includes a ferrite structure with a main section with a top side, a first side section and a second side section. The first side section and the second side section each have a bottom side. A portion of the top side of the main section is adjacent to a portion of the bottom side of the first side section and the second side section, and a portion of the first charging coil and a portion of the second charging coil are positioned adjacent to the top side of the main section interior to where the first side section and the second side section are adjacent to the top side of the main section. A portion of the first charging coil is adjacent to the bottom side of the first side section and a portion of the second charging coil is adjacent to the bottom side of the second side section. The system includes an inverter connected to the first and second charging coils. The inverter injects a signal in the first and second charging coils, where the injected signal generates an electromagnetic field radiating in a direction away from the top side of the main section.

In one embodiment, the first charging coil, the second charging coil and the ferrite structure are part of a primary pad and the system includes a secondary pad magnetically coupled to the primary pad. The secondary pad converts energy from the electromagnetic field into electrical energy. The system includes a secondary circuit connected to the secondary pad, where the secondary circuit receives the electrical energy from the secondary pad and conditions the electrical energy for use by a load.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

Figure 4:
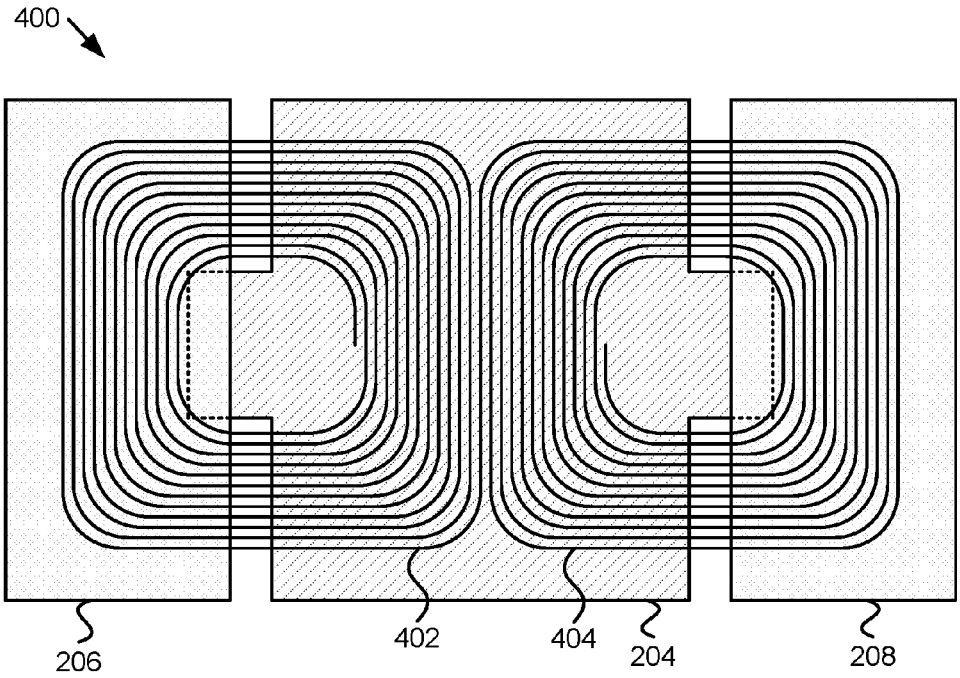
Figure 5:
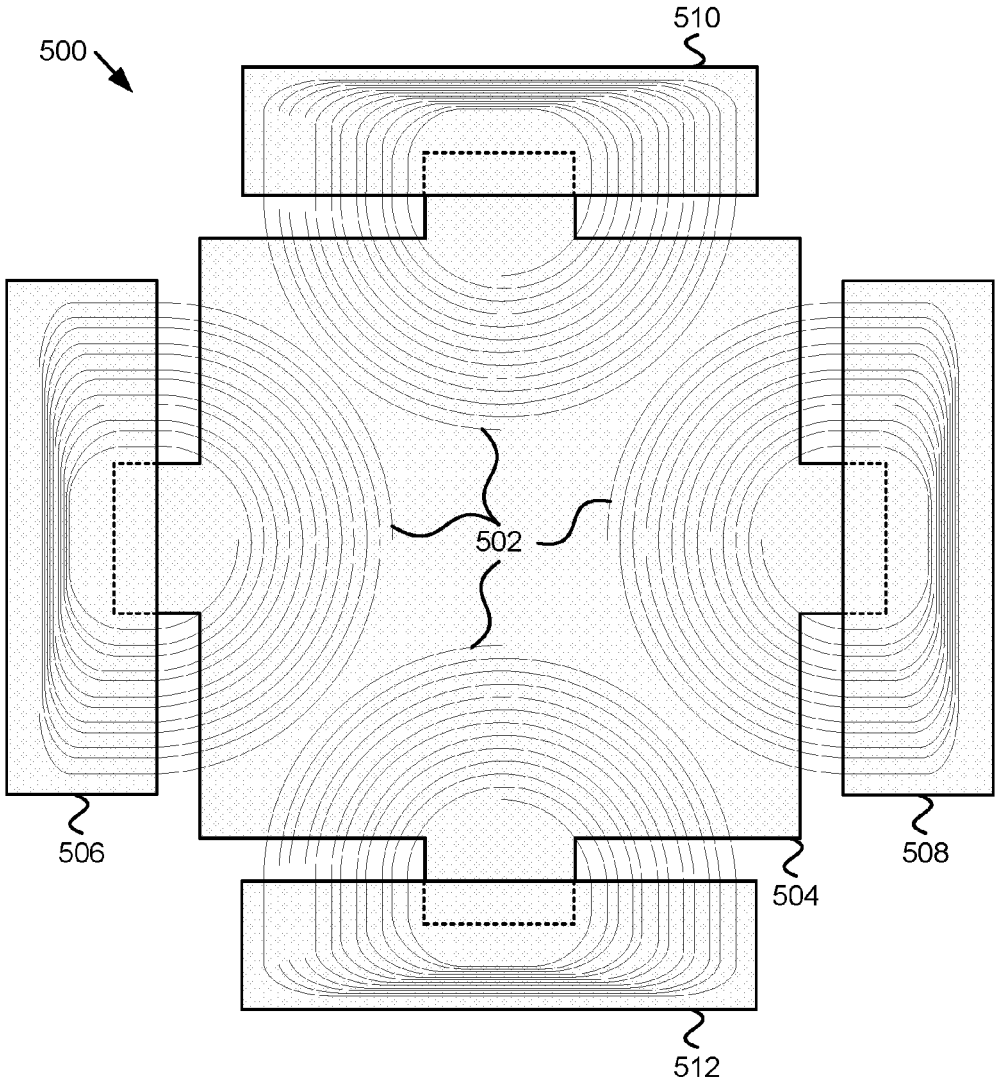
Figure 6:
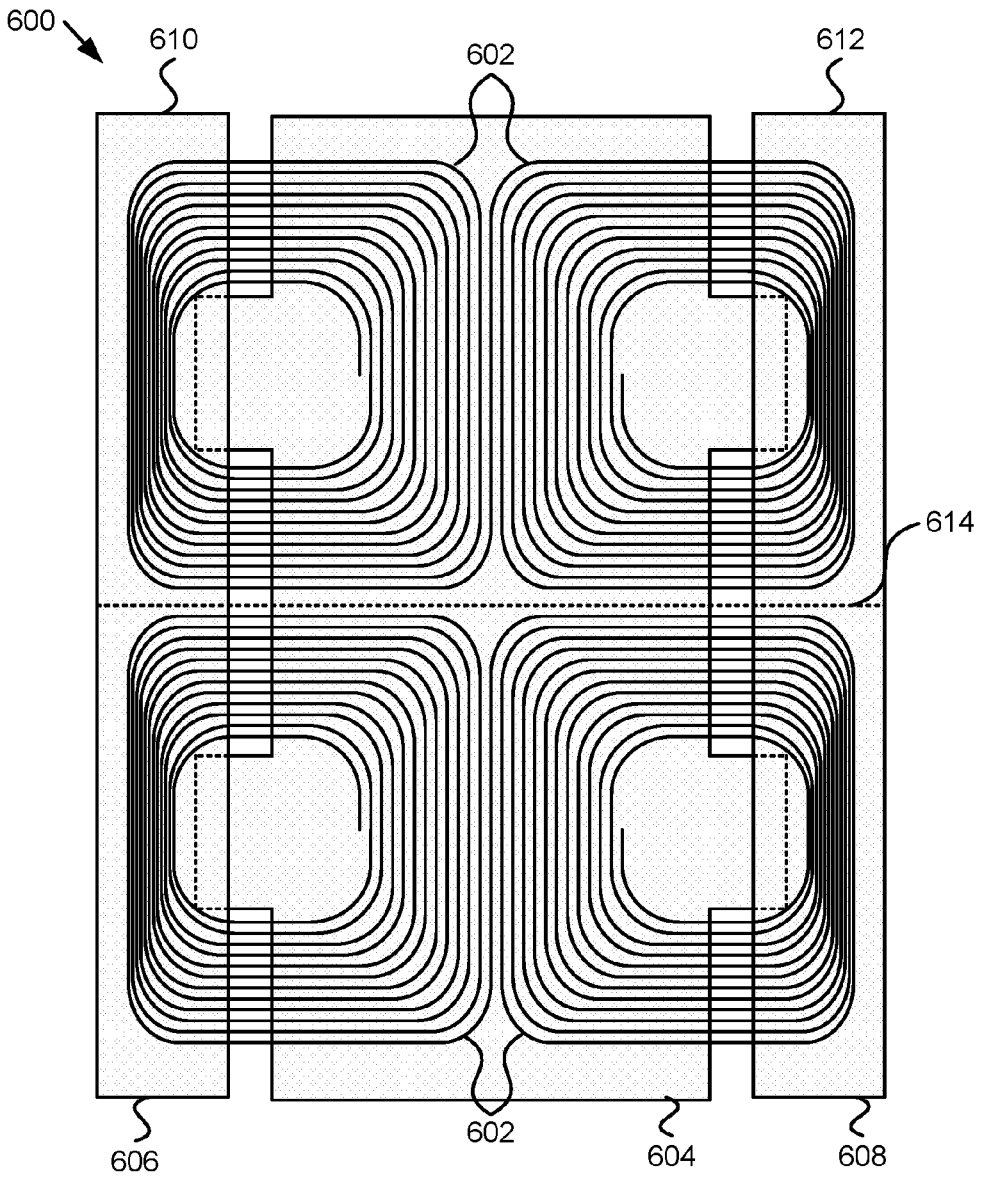
Figure 7:
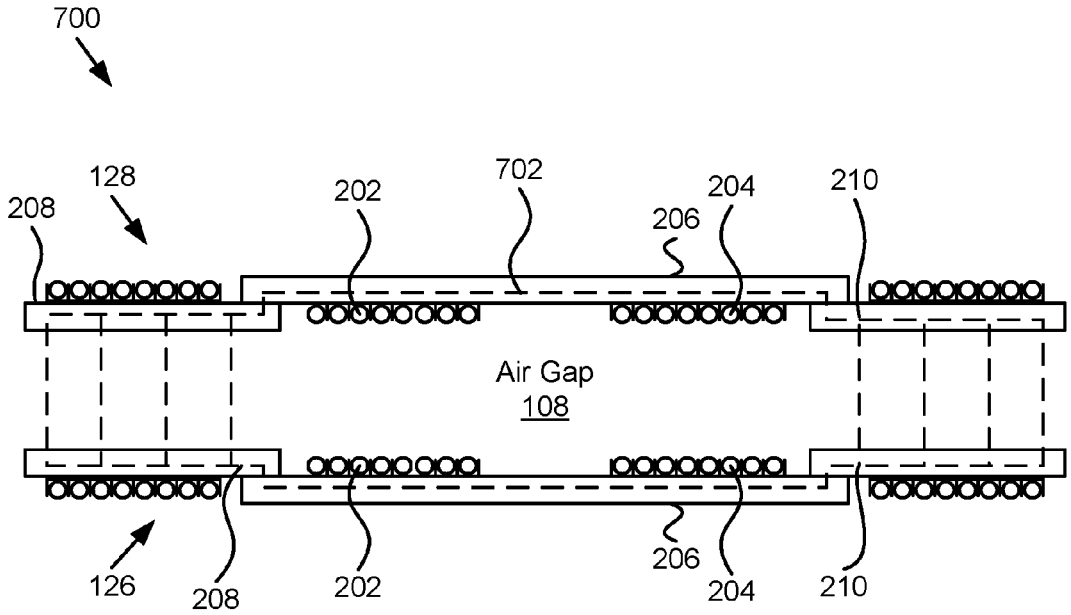

3G depicts a side section view of another embodiment of a wireless power transfer pad with a bi-plane ferrite structure and accompanying charging coils extending above and below sections of the ferrite structure, where a portion of the charging coils are bundled;

FIG. 4 depicts a top view of another embodiment of a bi-plane wireless power transfer pad using a square winding pattern;

FIG. 5 depicts a top view of another embodiment of a bi-plane wireless power transfer pad with four charging coils arranged in an X pattern;

FIG. 6 depicts a top view of another embodiment of a bi-plane wireless power transfer pad with four charging coils arranged in a side-by-side pattern; and FIG. 7 depicts a side section view of a primary pad and a secondary pad with bi-plane ferrite structures.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
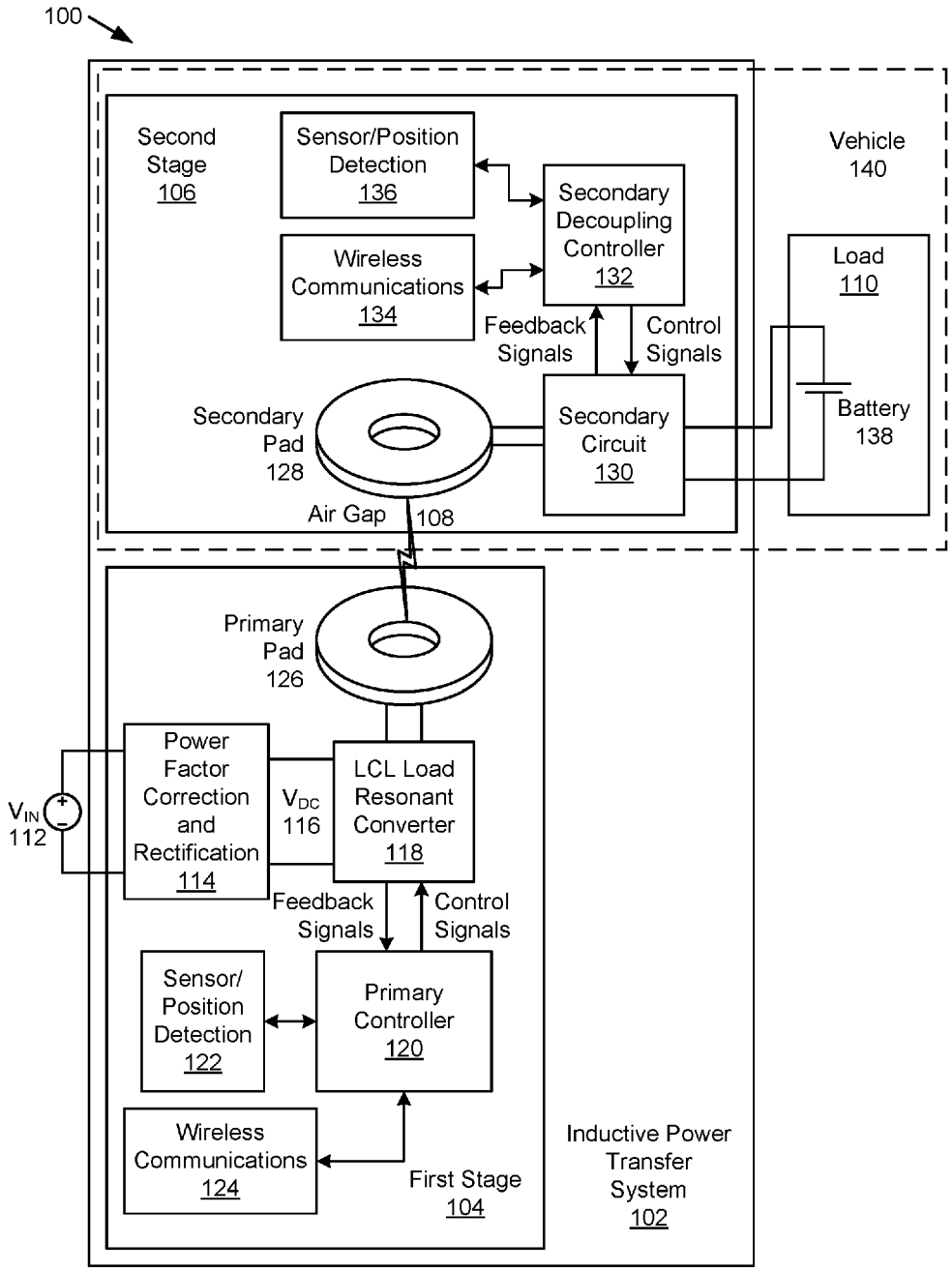
FIG. 1 illustrates a block diagram of an exemplary inductive power transfer ("IPT") charging system.

FIG. 1 depicts a schematic block diagram of one embodiment of an IPT charging system 100 for wireless power transfer. FIG. 1 illustrates a block diagram of an exemplary inductive power transfer ("IPT") charging system 100. The IPT charging system 100 of FIG. 1 is one embodiment of a system 100 that may include an IPT system 102, as described below. In other embodiments, the IPT system 102 may be used for purposes other than for charging. The IPT system 102 includes a first stage 104, a second stage 106, and wireless power transfer between the first stage 104 and second stage 106 over an air gap 108. The system 100 includes a load 110 and a voltage source 112. The elements of the IPT charging system 100 are described below.

The IPT charging system 100 includes, in one embodiment, a first stage 104 with an LCL (i.e. inductor-capacitor-inductor) load resonant converter 118 that receives a direct current ("DC") voltage 116 and generates an alternating current ("AC") voltage waveform in the primary pad 126. For example, a switching section may alternatively connect the DC voltage 116 to an LCL load resonant section at a particular frequency to generate an AC voltage waveform. The AC voltage waveform, in some embodiments, is not a pure sinusoidal waveform and includes harmonic voltages. Filtering in the LCL load resonant converter 118 may reduce harmonic content.

The AC voltage waveform and associated current are transmitted to the primary pad 126, which generates an electromagnetic waveform shaped by the design of the primary pad 126 to radiate in a direction toward the secondary pad 128. Through magnetic coupling, an electromagnetic waveform is induced in the secondary pad 128 and generates an AC electrical waveform in the secondary pad 128. The electrical waveform, with a particular voltage waveform and current waveform, in the secondary pad 128 transfers power to the secondary circuit 130, which may condition the voltage and current for use by a load 110, such as a battery 138, electric motor, etc. The secondary circuit may include a rectifier section and may also include a DC-DC converter, or similar circuit to regulate voltage and/or current to the load 110. The second stage 106 and load 110 may be part of a vehicle 140.

The primary controller 120 controls the LCL load resonant converter 118 and the secondary decoupling controller 132 controls the secondary circuit 130. The IPT charging system 100 may also include one or more sensors for position detection 122. While the sensors for position detection 122 is shown in the first stage 104, one of skill in the art will recognize that all or part of the sensors for position detection 122 may be located in the second stage 106, on the vehicle 140, or elsewhere in the IPT system 102. In one embodiment, the IPT charging system 100 includes wireless communications 124, 134 that provide for communication between the first stage 104 and the second stage 106. Wireless communication may be used for control, position sensing, identification, and the like.

The IPT charging systems 100 described herein may include a power factor stage 114, such as a primary alternating current ("AC") to direct current ("DC") power factor stage, fed from a voltage source 112, such as from a utility power grid. In some embodiments, a primary AC-DC converter stage may be configured to convert grid-level voltages to a DC voltage 116, such as a DC bus voltage, for a primary tuned resonant converter. A DC output voltage with low output ripple is preferred to large ripple systems in order to prevent an amplitude modulated signal appearing in the wireless inductive power transfer system which can cause reduced efficiency and require additional complexity.

In some embodiments, active power factor correction ("PFC") in AC-DC converters may help to ensure the grid voltage and current are closely in phase. PFC may reduce overall grid current requirements and typically reduces grid harmonics (i.e. the grid represented by the voltage source 112). Grid power supply companies typically have certain harmonic requirements for attached industrial equipment. Often grid power supply companies also charge extra for power to industrial equipment that exhibits low power factor.

In the IPT charging system 100 described herein, one or more suitable stages may be used for PFC. For example, one or more commercial off-the-shelf ("COTS") AC-DC high efficiency power factor corrected converters may be used. The grid voltage source 112 may be a wide range of voltage inputs including, for example, single-phase 240 VAC, three-phase 208 VAC, or three-phase 480 VAC. In another embodiment, a 400 VDC output may be used for this stage and 400 VDC is typically an efficient output for a nominal grid input of single-phase 240 VAC grid input. A single-phase 240 VAC grid voltage with a 30 A circuit (suitable for a 5 kW IPT system) is commonplace in the United States even in areas that do not support industrial three-phase voltages, and may be used with the IPT charging system 100.

For the IPT charging system 100, in one embodiment, the first stage 104 includes an LCL load resonant converter 118 controlled by a primary controller 120 that may receive feedback signals from and may send control signals to the LCL load resonant converter 118. A primary controller 120 may receive information from alignment sensors for position detection 122 and may communicate using wireless communications 124. The LCL load resonant converter 118 is coupled to a primary pad 126 coupled to a secondary pad 128 over an air gap 108.

While an air gap 108 is depicted, one of skill in the art will recognize that at least a portion of the space between the primary pad 126 and the secondary pad 128 include other materials and substances, such as concrete, resin, asphalt, metal, and the like. The secondary pad 128 is connected to a parallel decoupling pickup shown as a secondary circuit 130 controlled by a secondary decoupling controller 132 that may receive feedback signals and may send control signals to the secondary circuit 130. The secondary decoupling controller 132 may also communicate with alignment sensors for position detection 136 for control and may communicate wirelessly 134. The secondary circuit 130 may connect to a load 110, such as a battery 138 and may charge the battery 138. The battery 138 may provide power to another load, such as a motor controller (not shown). The second stage 106 and load 110 may be located in a vehicle 140.

Other embodiments of an IPT system 102 may include wireless power transfer for other purposes, such as battery charging and power for consumer electronic devices, such as a cellular phone, an electric razor, an electric toothbrush, and the like. One of skill in the art will recognize other uses for wireless power transfer and other IPT systems.

Figure 2A:
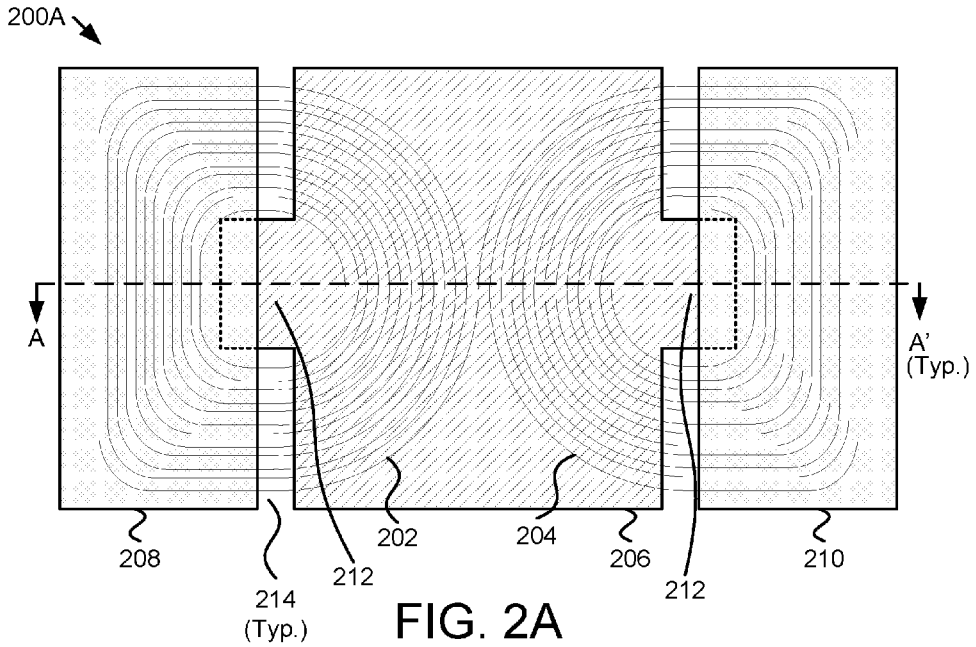
FIG. 2A depicts a top view of a first embodiment of a bi-plane wireless power transfer pad.

FIG. 2A depicts a top view of a first embodiment of a bi-plane wireless power transfer ("WPT") pad 200A. The WPT pad 200A may be a primary pad 126 or a secondary pad 128. The WPT pad 200A includes a first charging coil 202 with one or more conductors arranged in a first winding pattern and a second charging coil 204 with one or more conductors arranged in a second winding pattern. In the embodiment, a portion of the second charging coil 204 is positioned adjacent to a portion of the first charging coil 202. In one example, each of the first charging coil 202 and the second charging coil 204 include one conductor. Other embodiments of WPT pads (e.g. 200B, 201) may also include charging coils 202, 204 with one conductor. The conductor may be wound in a spiral pattern so that if a loop starts at an interior location each successive loop is adjacent to the previous loop in an ever-increasing spiral. The spiral pattern may be similar to an Archimedean spiral or an arithmetic spiral. In one embodiment, a conductor of each of the first charging coil 202 and the second charging coil 204 have a portion that is in a same plane. Other embodiments may include a first charging coil 202 and a second charging coil 204 where each includes two or more conductors. The two or more conductors may be wound in parallel, as depicted in the WPT pad 203 of FIG. 2D.

The WPT pad 200A, in one embodiment, includes a multi-level ferrite structure that includes a main section 206 with a top side, a first side section 208 and a second side section 210 where each side section 208, 210 includes a bottom side. In one embodiment, a portion of the top side of the main section 206 is adjacent to a portion of the bottom side of the first side section 208 and the second side section 210. In the embodiment, having the portion of the top side section 208 adjacent to the portion of the bottom side of the first side section 208 and second side section 210 includes the top side of the main section 206 being coplanar to the bottom side of the first side section 208 and the second side section 210. For example, a portion of the bottom side of the first side section 208 and/or the second side section 210 may touch the top side of the main section 206. In other embodiments, the bottom side of the first side section 208 and second side section 210 may be offset from the bottom of the main section 206 and may be higher or lower than the top side of the main section 206.

The bottom side of the first side section 208 and the bottom side of the second side section 210, in the embodiment, are not coplanar with a bottom side of the main section 206, but are instead raised with respect to a plane of the bottom side of the first and second side sections 208, 210 by an offset. In one embodiment, the offset is at least a thickness of the first charging coil 202 and/or the second charging coil 204 where the thickness is measured in a direction perpendicular to the bottom side of the first side section 208 and/or the second side section 210.

Figure 3A:
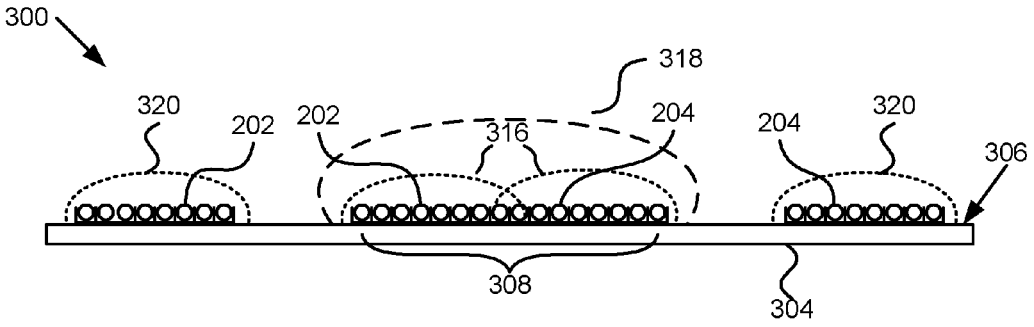
FIG. 3A depicts a side section view of one embodiment of a wireless power transfer pad with charging coils in one plane.
Figure 3B:
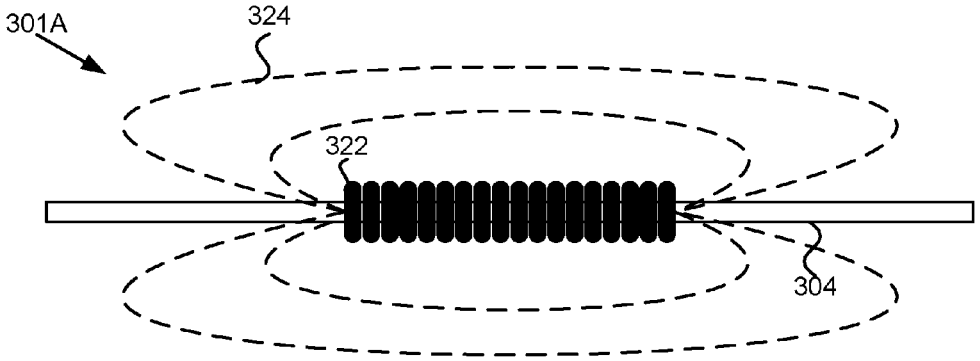
FIG. 3B depicts a solenoid with a ferrite structure with a charging coil wrapped around the ferrite structure.

In the embodiment depicted in FIG. 2A, a portion of the first charging coil 202 and the portion of the second charging coil 204 that are adjacent to the main section 206 are positioned on the top side of the main section 206. For example, the bottom side of the first side section 208 and/or the second side section 210 may be in contact with the top side of the main section 206. Also, a portion of the first charging coil 202 is adjacent to the bottom side of the first side section 208 and a portion of the second charging coil 204 is adjacent to the bottom side of the second side section 210. Having the bottom side of the first side section 208 and the bottom side of the second side section 210 raised with respect to a plane of the bottom side of the first and second side sections 208, 210 allows that the first charging coil 202 and the second charging coil 204 to have a portion adjacent to the first side section 208 and second side section 210 elevated with respect to the plane of the bottom side of the main section 206, which typically provides for a thinner WPT pad 200A than a flat ferrite structure, as depicted in FIG. 3D. Arrangement of the first charging coil 202, the second charging coil 204, the main section 206, the first side section 208, and the second side section 210 are depicted in a side section view in FIG. 3F.

By arranging two coils (e.g. 202, 204) to be adjacent, the electromagnetic field formed above the first and second charging coils 202, 204 may be additive where current is circulated in the first and second charging coils 202, 204 so that the electromagnetic field formed by each of the first and second charging coils 202, 204 are directed upward, in a direction perpendicular to the main section 206 in a direction from the main section 206 toward the portion of the first and second charging coils 202, 204 that are adjacent. In looking at FIG. 2A, the electromagnetic field would be directed out of the page toward the viewer, as depicted in FIGS. 3D-3G by the dashed lines 316, 318. Over the portions of the first and second charging coils 202, 204 that are adjacent, the resulting electromagnetic flux pattern 318 may be increased compared to the electromagnetic fields 316 of the first and second charging coils 202, 204.

Portions of the first and second charging coils 202, 204 extending below the first and second side sections 208, 210 may generate an electromagnetic field with a portion that is directed downward, which may be unusable for charging with regard to wireless power transfer to a secondary pad 128. Directing this portion of the electromagnetic field below the first and second side sections 208, 210 downward may be advantageous so that this portion of the electromagnetic field may be directed toward the earth or away from users.

Figure 2B:
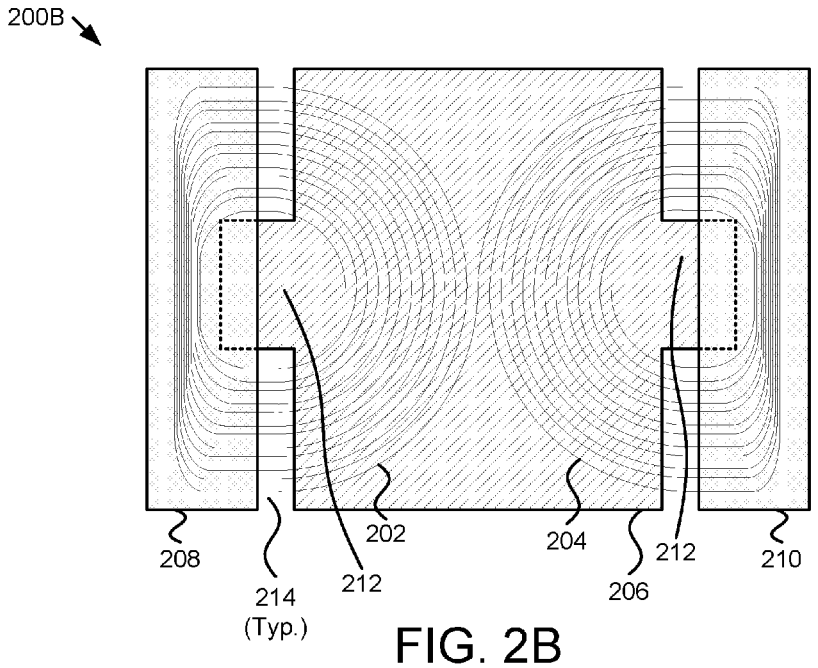
FIG. 2B depicts a top view of a second embodiment of a bi-plane wireless power transfer pad.

In the embodiment depicted in FIG. 2A, the portions of the first and second charging coils 202, 204 that are below the first and second side sections 208, 210 are depicted as spread out and may be in a plane adjacent to a bottom side 312 of the first and second side sections 208, 210. Maintaining the conductors of the first and second charging coils 202, 204 side-by-side under the first and second side sections 208, 210 may be unnecessary because shaping an electromagnetic field in a downward direction may not be useful and may require side sections 208, 210 that are larger than necessary. The WPT pad 201 depicted in FIG. 2B depicts the portions of the first and second charging coils 202, 204 that are below the first and second side sections 208, 210 as bunched together. As depicted in FIG. 3G, bunching the conductors may include multiple layers of conductors (see 310). Bunching the conductors of the first and second charging coils 202, 204 on the bottom of the first and second side sections 208, 210 may serve to reduce the size of the first and second side sections 208, 210. While the portions of the first and second charging coils 202, 204 below the first and second side sections 208, 210 will generate some electromagnetic field, bunching the conductors may serve to reduce conductor length, reduce the size of the ferrite structure, and may result in an electromagnetic field around the bunched conductors that is not shaped in a particular direction where shaping is not needed.

The main section 206 of the ferrite structure in the WPT pads 200A, 200B of FIGS. 2A and 2B include a tab section 212 that extends under the first and second side sections 208, 210. The tab sections 212 in one embodiment, allow the first and second side sections 208, 210 to be magnetically coupled to the main section 206 and may provide a convenient surface for the first and second side sections 208, 210 to contact the main section 206. Note that the tab sections 212 are depicted as a particular width that is less than the inner-most winding of the first and second charging coils 202, 204. A notch 214 is formed to the sides of the tab section 212, which may be a convenient location for the first and second charging coils 202, 204 to transition from the top side of the main section 206 to the bottom side of the first and second side sections 208, 210. As winding patterns vary, one of skill in the art will recognize other widths for the tab sections 212 and associated notches 214. The first and second winding patterns may also vary depending on shaping requirements of a desired electromagnetic field.

Figure 2C:
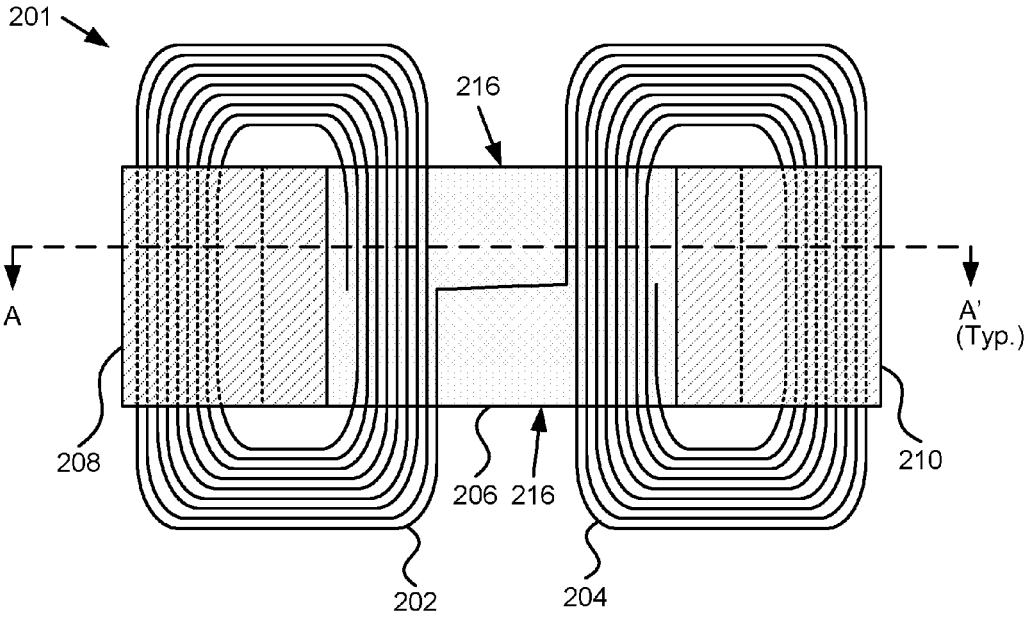
FIG. 2C depicts a top view of a third embodiment of a bi-plane wireless power transfer pad.

FIG. 2C depicts a top view of a third embodiment of a bi-plane wireless power transfer pad 201. The WPT pad 201 includes a first charging coil 202 and second charging coil 204, each with one conductor. The ferrite structure of the WPT pad 201 includes a main section 206, a first side section 208, and a second side section 210 which are each rectangular (or square) and the main section 206 does not include tab sections 212. The first and second charging coils 202, 204 wrap around edges 216 of the main section 206, as depicted in FIG. 3E.

Figure 3C:
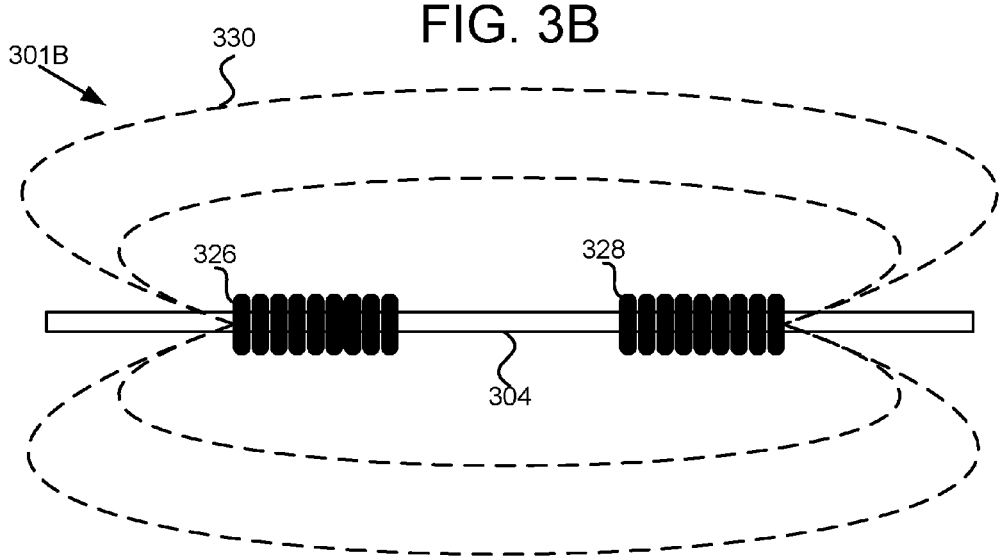
FIG. 3C depicts a solenoid with a ferrite structure with two charging coils wrapped around the ferrite structure.
Figure 3D:
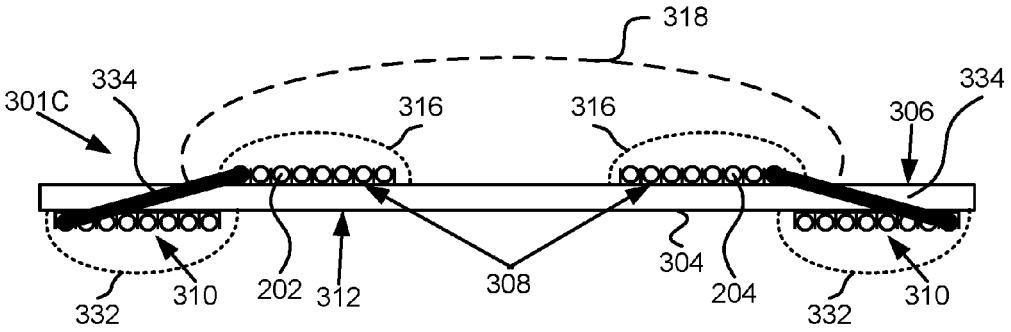
FIG. 3D depicts a side section view of one embodiment of a wireless power transfer pad with a uniform ferrite structure and charging coils extending above and below the ferrite structure.
Figure 3E:
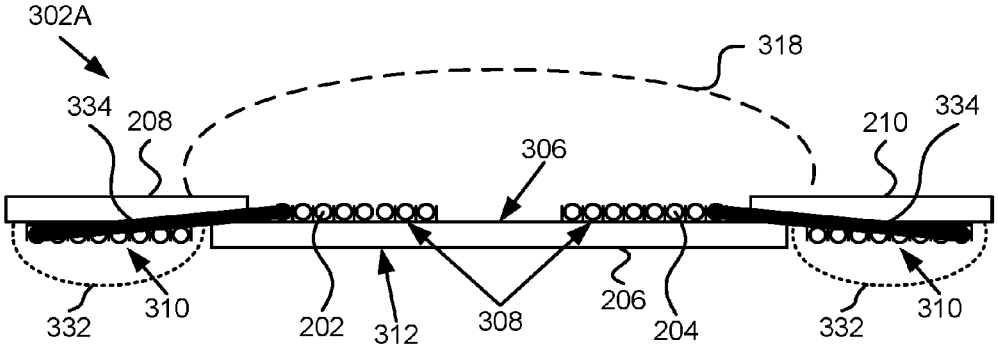
FIG. 3E depicts a side section view of one embodiment of a wireless power transfer pad with a bi-plane ferrite structure and accompanying charging coils extending above and below sections of the ferrite structure.

The first and second charging coils 202, 204, in one embodiment, extend a distance beyond the edges 216 of the main section 206 to accommodate a finite bending radius of the conductors and to accommodate a structure used to maintain position of the first and second charging coils 202, 204 and may be wrapped closer than depicted in FIG. 3C where a conductor is used with a tighter bending radius or a structure maintaining position of the first and second charging coils 202, 204 is more flexible, smaller, etc. By winding the first and second charging coils around the ferrite structure, the WPT pads 200A, 200B, 201 more closely match a solenoid, which may provide stronger magnetic fields than a WPT pad with charging coil(s) on a top side.

Figure 2D:
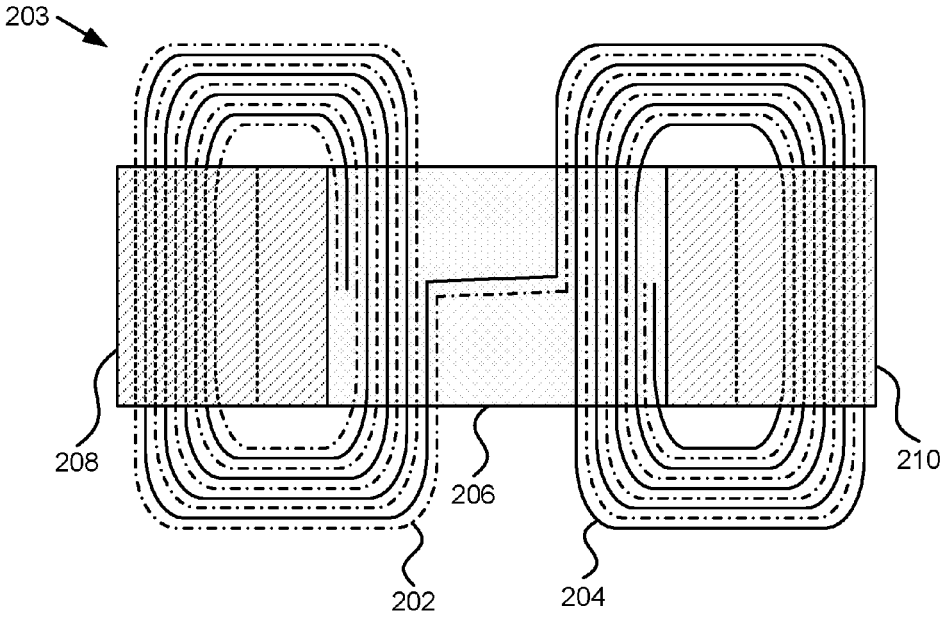
FIG. 2D depicts a top view of a fourth embodiment of a bi-plane wireless power transfer pad with two conductors per charging coil.

FIG. 2D depicts a top view of a fourth embodiment of a bi-plane wireless power transfer pad 203 with two conductors per charging coil. The WPT pad 203 of FIG. 2D is similar to the WPT pad 201 of FIG. 2C where the ferrite structures of the WPT pads 201, 203 are the same but the first and second charging coils 202, 204 each have two conductors wound in parallel. Having two conductors in parallel allow connection of the conductors in parallel, which decreases an amount of voltage required to be applied to the WPT pad 203, as described in U.S. Patent Application No. 62/186,257, filed Jun. 29, 2015 for Patrice Lethellier, et al., which is herein incorporated by reference for all purposes.

FIG. 3A depicts a side section view of one embodiment of a wireless power transfer pad 300 with first and second charging coils 202, 204 in one plane. FIG. 3A depicts another embodiment that serves to illustrate an alternate design. In the embodiment, a portion 308 of the first and second charging coils 202, 204 are adjacent. In the design depicted in FIG. 3A, two coils are positioned on top of a single, planar ferrite structure 304. Each of the first and second charging coils 202, 204 generate a magnetic field 316 shaped to radiate upward, away from the ferrite structure 304 so that a resulting electromagnetic flux pattern 318 that extends higher than each of the first and second charging coils 202, 204 alone.

However, the portions of the first and second charging coils 202, 204 away from the center also generate electromagnetic flux 320 and don't readily combine with each other so that only the portion over the adjacent sections combine to form a heightened electromagnetic flux pattern 318. In addition, the first and second charging coils 202, 204 do not wrap around the ferrite structure, so generated magnetic flux is less than other designs that wrap around the ferrite structure. The electromagnetic flux 320 over the portion of the first and second charging coils 202, 204 don't contribute in any significant way to power transfer to the secondary pad 128 and are typically unwanted. Leakage electromagnetic flux may make it more difficult to comply with regulations and may require shielding, barriers to keep people away, etc. Elimination or minimization of the leakage electromagnetic flux, such as the electromagnetic flux 320 in FIG. 3A is beneficial in many circumstances.

FIG. 3B depicts a solenoid 301A with a ferrite structure 304 and a charging coil 322 wrapped around the ferrite structure 304. The ferrite structure 304 and charging coil 322 are in the form of a typical solenoid 301A. Wrapping the charging coil 322 around the ferrite structure 304 provides a strong electromagnetic field 324 with a north pole at one end and a south pole at the other end. The electromagnetic field 324 is affected by the shape of the ferrite structure 304 and charging coil 322. The ferrite structure 304 may be shaped as a rectangular prism with a top side that is planar, as depicted in the main section 206 of the WPT pad 201 of FIG. 2C, or in other shapes.

FIG. 3C depicts another solenoid 301B with ferrite structure 304 and two charging coils 326, 328 wrapped around the ferrite structure 304. By splitting the charging coil 322 of the solenoid 301A of FIG. 3B into two charging coils 326, 328, the north and south poles may be spread apart, which may then form an electromagnetic field 330 that extends further from the ferrite structure 304 than the electromagnetic field 324 of the solenoid 301A of FIG. 3B.

FIG. 3D depicts a side section view of one embodiment of a wireless power transfer pad 301C with a uniform ferrite structure 304 and a charging coil extending above and below the ferrite structure 304. By wrapping the first and second charging coils 202, 204 around to the bottom side of the ferrite structure 304 or by feeding the first and second charging coils 202, 204 through gaps (not shown) in the ferrite structure 304, a portion 310 of the first and second charging coils 202, 204 are below the bottom side 312 of the ferrite structure 304 and radiate electromagnetic flux 332 in a downward away from the bottom side 312 of the ferrite structure 304. Thus, the unwanted electromagnetic flux 320 of the WPT pad 300 of FIG. 3A is modified for the WPT pad 301C of FIG. 3D so that the unwanted electromagnetic flux 332 radiates downward, which may be more easily controllable. For example, at least a portion of the unwanted electromagnetic flux 332 may be directed into the earth where the WPT pad 301C is ground mounted. In other embodiments, shielding or measures may be taken under the WPT pad 301C to minimize impact. A disadvantage of the design of the WPT pad 301C depicted in FIG. 3D is that the WPT pad 301C has the added thickness of the portion 310 of the first and second charging coils 202, 204 and any associated support structure for the first and second charging coils 202, 204. Adding thickness to a WPT pad (e.g. 300, 301C) may be inconvenient.

FIG. 3E depicts a side section view (e.g. modified section A-A' of FIG. 2C) of one embodiment of a wireless power transfer pad 302A with a bi-plane ferrite structure and accompanying charging coils 202, 204 extending above and below sections of the ferrite structure. Like the WPT pad 301C of FIG. 3D, a portion 310 of the first and second charging coils 202, 204 extend below the ferrite structure. However, the ferrite structure is modified to include a main section 206, a first side section 208 and a second side section 210 as depicted in the WPT pads 200A, 200B, 201, 203 of FIGS. 2A-2D. By placing the first and second side sections 208, 210 above the main section 206 as depicted, or at least elevated with respect to the main section 206, where the portions 310 below the first and second side sections 208, 210 are lifted above where they are located in the WPT pad 301C of FIG. 3D, the overall thickness of the WPT pad 302A of FIG. 3E can be made to be thinner than the WPT pad 301C of FIG. 3D. In addition, at least a portion of the unwanted electromagnetic flux 332 is again directed downward, away from the bottom of the first and second side sections 208, 210.

In one embodiment, such as depicted for the WPT pads 200A, 200B of FIG. 2A, 2B, the first and second charging coils 202, 204 may be routed through notches 214 adjacent to the tab section 212 of the main section 206. Routing the first and second charging coils 202, 204 through the notches 214 may be a convenient way to maintain the shape of the portion 308 of the first and second charging coils 202, 204 over the main section 206 while allowing the first and second charging coils 202, 204 to transition to the bottom 312 of the first and second side sections 208, 210. While the path of the first and second charging coils 202, 204 are depicted as straight, one of skill in the art will recognize that the first and second charging coils 202, 204 may bend to be routed through the notches 214.

In another embodiment, such as depicted in the WPT pads 201, 203 of FIGS. 2C and 2D, the first and second charging coils 202, 204 may be routed around the edges 216 of the main section 206. Routing the first and second charging coils 202, 204 around the edges 216 of the main section 206 may allow for a more compact ferrite structure than is depicted in the WPT pads 200A, 200B of FIGS. 2A and 2B. For clarity, routing of the first and second charging coils 202, 204 from above the main section 206 to below the first and second side sections 208, 210 is not depicted except for a single conductor 334 for each charging coil 202, 204.

Figure 3F:
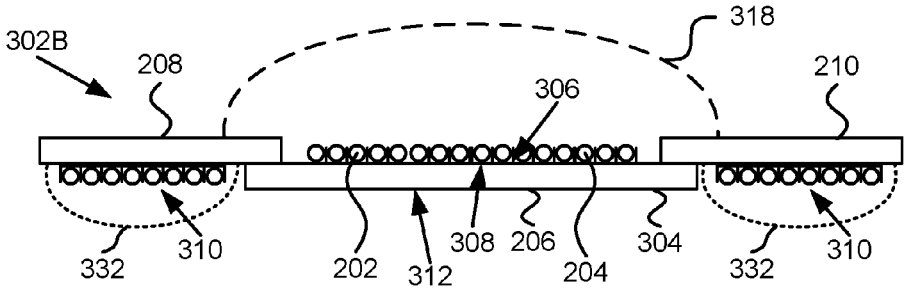
FIG. 3F depicts a side section view of another embodiment of a wireless power transfer pad with a bi-plane ferrite structure and accompanying charging coils extending above and below sections of the ferrite structure, where a portion of the charging coils are adjacent.
Figure 3G:
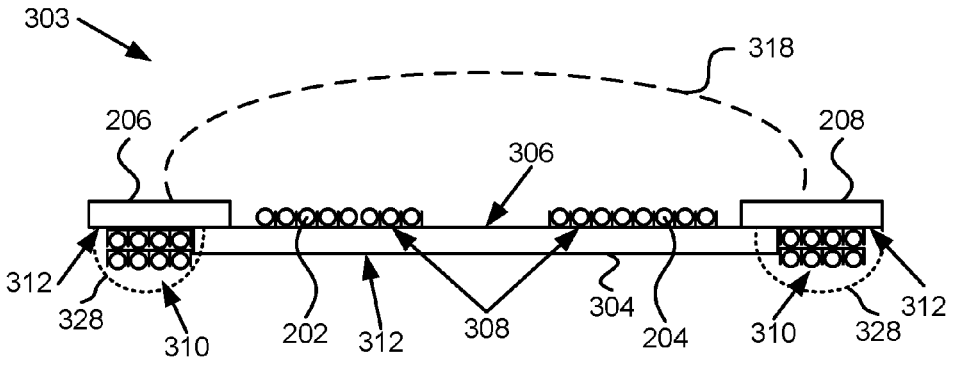

FIG. 3F depicts a side section view of another embodiment of a wireless power transfer pad 302B with a bi-plane ferrite structure and accompanying first and second charging coils 202, 204 extending above and below sections of the ferrite structure, where a portion of the first and second charging coils 202, 204 are adjacent. The ferrite structure of the WPT pad 302B may be similar to the ferrite structure of the WPT pad 302A, except the main section 206 may be smaller so that the overall width of the WPT pad 302A may be less than the WPT pad 302A of FIG. 3E. A smaller main section 206 with first and second charging coils 202, 204 may have an electromagnetic flux pattern 318 above the main section 206 that is less than where the first and second charging coils 202, 204 are split, but may provide a more compact design. In other embodiments, reducing a space between the first and second charging coils 202, 204 may be the result of adding additional wraps to the first and second charging coils 202, 204. One of skill in the art will recognize other designs with and without a space between the first and second charging coils 202, 204.

FIG. 3G depicts a side view of another embodiment of a wireless power transfer pad 303 with a bi-plane ferrite structure and accompanying first and second charging coils 202, 204 extending above and below sections of the ferrite structure, where a portion 310 of the charging coils are bundled. Where the electromagnetic flux 332 below the first and second side sections 208, 210 and is unwanted, maintaining the portions 310 of the first and second charging coils 202, 204 in a plane may be unnecessary. To reduce a width of the ferrite structure, the portions 310 of the first and second charging coils 202, 204 below the first and second side sections 208, 210 may be bundled so that the first and second side sections 208, 210 may be shortened in width. The unwanted electromagnetic flux 332 from the portions 310 of the first and second charging coils 202, 204 below the first and second side sections 208, 210 will be shaped differently, which may be unimportant.

Note that shaping of the portions 308 of the first and second charging coils 202, 204 may be used to shape the electromagnetic flux pattern 318 above the ferrite structure. The types of conductors, the spacing of the conductors, the routing of the conductors, etc. may be used to modify the electromagnetic flux pattern 318 above the ferrite structure.

FIG. 4 depicts a top view of another embodiment of a bi-plane wireless power transfer pad 400 using a square winding pattern. The WPT pad 400 depicts another way to wind a first charging coil 402 and a second charging coil 404 that changes the shape of the electromagnetic flux above the WPT pad 400. The square pattern may create electromagnetic flux that is more even along an axis between the first and second charging coils 402, 404.

FIG. 5 depicts a top view of another embodiment of a bi-plane wireless power transfer pad 500 with four charging coils 502 arranged in an X pattern. A ferrite structure associated with the WPT pad 500 includes a main section 504 and side sections 506, 508, 510, 512 that are similar to those depicted in the WPT pads 201, 303 of FIGS. 2A and 3D, but include additional charging coils 502 and side sections 510, 512. While "D" shaped charging coils 502 are depicted, other charging coil designs may be used. For example, the charging coils 502 may be shaped with a pointed portion directed to a center of the main section 504. The charging coils 502 may be connected to each produce an electromagnetic field above the main section 504 in a direction away from a top side of the main section 504. However, the X pattern may not be as efficient for sharing flux between coils as other designs.

FIG. 6 depicts a top view of another embodiment of a bi-plane wireless power transfer pad 600 with four charging coils 602 arranged in a side-by-side pattern. Like the WPT pad 500 of FIG. 5, the WPT pad 600 of FIG. 6 includes a ferrite structure with a main section 604, and side sections 606, 608, 610, 612. The WPT pad 600 includes charging coils 602 in a square winding pattern, which may more efficiently fill a space above a main section 604 to produce a more uniform electromagnetic field than "D" shaped winding patterns or other winding patterns.

In another embodiment (not shown), the ferrite structure of the WPT pads 201, 203 may be used with a square winding pattern. In another embodiment, the ferrite structure may be split (e.g. along line 614) so that two WPT pads 200B of FIG. 2B are provided. In another embodiment, the ferrite structure may be split (e.g. along line 614) with a gap in between so that two WPT pads 201 of FIG. 2C are provided. In the embodiment, the first and second charging coils 202, 204 may extend beyond the edges 216 of the main section 206. In another related embodiment, the WPT pads 201 may be part of a primary pad 126 and two additional WPT pads 201 may form a secondary pad 128. In one example, the WPT pads 201 of the secondary pad 128 may be positioned perpendicular to the WPT pads 201 of the primary pad 126 forming a square shape where magnetic flux may be shared efficiently in a ring pattern.

As with the WPT pad 303 of FIG. 3G, the portions of the charging coils 602 under the side sections 606, 608, 610, 612 may be bundled or otherwise compacted. One of skill in the art will recognize other winding patterns with multiple charging coils and a bi-plane ferrite structure. For example, a WPT pad may include three charging coils, five charging coils, coils two or more conductors wound together and connected in parallel, etc.

FIG. 7 depicts a side section view of a primary pad 126 and a secondary pad 128 with bi-plane ferrite structures. The primary pad 126 and the secondary pad 128 may be similar to the WPT pad 201 of FIG. 2C where the secondary pad 128 is inverted. A magnetic flux path 702 is depicted showing how magnetic flux runs through the ferrite structure of the primary pad 126, up through an air gap 108 at one end, through the ferrite structure of the secondary pad 128 and through the air gap 108 at the other end. The magnetic flux lines are not complete and are only intended to depict a pathway for magnetic flux. One of skill in the art will recognize other details of an electromagnetic field formed between the primary pad 126 and the secondary pad 128.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:

a first charging coil comprising one or more conductors arranged in a first winding pattern;

a second charging coil comprising one or more conductors arranged in a second winding pattern; and a multi-level ferrite structure comprising a main section at a first level, the main section comprising a top side along a plane, [a first side portion and second side portion,] a first side section at a second level and a second side section at the second level, the first side section and the second side section each comprising a bottom side positioned along the plane, wherein [the] *a* first side portion of the top side of the main section is adjacent to a portion of the bottom side of the first side section along the plane and [the] *a* second side portion of the top side of the main section is adjacent to a portion of the bottom side of the second side section along the plane, and wherein a portion of the first charging coil and a portion of the second charging coil are positioned adjacent to the top side of the main section in the first level along the plane and interior to where the first side section and the second side section are adjacent to the top side of the main section, a portion of the first charging coil is adjacent to the bottom side of the first side section [in the second section] along the plane and a portion of the second charging coil is adjacent to the bottom side of the second side section [in the second section] along the plane, wherein a signal injected in the first and second *charging* coils generates an electromagnetic field radiating in a direction away from the top side of the main section.

2. The apparatus of claim 1, wherein the main section is magnetically coupled to the first side section and to the second side section.

3. The apparatus of claim 1, further comprising a space between the portion of the first charging coil and the portion of the second charging coil located adjacent to the top side of the main section.

4. The apparatus of claim 1, wherein the main section, the first side section and the second side section of the ferrite structure are separate and wherein the top side of the main section is in contact with the bottom side of [to] the first side section and with the bottom side of the second side section.

5. The apparatus of claim 1, wherein the portion of the first charging coil and the portion of the second charging coil adjacent to the top side of the main section are wound in a spiral pattern in a plane parallel to the top side of the main section.

6. The apparatus of claim 1, wherein the ferrite structure comprises a first edge and a second edge, the first and second [edge] *edges* located distal to a plane bisecting the main section, the first side section and the second side section, the first charging coil and the second charging coil [extend] *extending* past the first and second edges of the ferrite structure.

7. The apparatus of claim 1, wherein the ferrite structure further comprises a plurality of notches, each notch accommodating a portion of one of the first charging coil and the second charging coil during a transition between the main section and one of the first side section and the second side section.

8. The apparatus of claim 1, wherein the main section is joined to the first side section and the second side section.

9. The apparatus of claim 1, wherein the portion of the first charging coil adjacent to the bottom side of the first side section is wound to group the one or more conductors in a pattern that minimizes one or more of conductor length and distance from a center point of the main section between the first charging coil and the second charging coil.

10. The apparatus of claim 1, wherein the one or more conductors of the first charging coil and the one or more conductors of the second charging coil each comprise two coils wound in a parallel pattern wherein a first coil of a charging coil of the first or second charging coils is wound adjacent to a second coil of the charging coil.

11. The apparatus of claim 1, wherein each of the one or more conductors of the first charging coil and the second charging coil are stacked in layers over the main section, each layer is in a plane parallel to the top side of the main section.

12. The apparatus of claim 1, wherein the first and second charging coils and the ferrite structure comprise a first pad section and further comprising a second pad section, the second pad section comprising two or more additional charging coils and an additional ferrite structure arranged the same as the first pad section, wherein the first pad section and the second pad section are arranged to form a charging pad.

13. The apparatus of claim 1, wherein the apparatus is part of a primary pad of a wireless power transfer system and further comprising an inverter connected to the first and second charging coils, the inverter injecting the signal in the first and second charging coils.

14. The apparatus of claim 13, further comprising a secondary pad magnetically coupled to the primary pad, the secondary pad converting energy from the electromagnetic field into electrical energy, and further comprising a secondary circuit connected to the secondary pad, wherein the secondary circuit receives the electrical energy from the secondary pad and conditions the electrical energy for use by a load.

15. [An apparatus comprising:] *The apparatus of claim 1,*

[a first charging coil comprising one or more conductors arranged in a first winding pattern;

a second charging coil comprising one or more conductors arranged in a second winding pattern; and a multi-level ferrite structure comprising a main section at a first level, the main section comprising a top side along a plane, a first side portion and second side portion, a first side section at a second level and a second side section at the second level, the first side section and the second side section each comprising a bottom side positioned along the plane,] *wherein* the main section *is* magnetically coupled to the first side section and to the second side section, *and* wherein the bottom side of the main section is offset from the bottom side of the first side section and from the second side section[, and wherein a portion of the first charging coil and a portion of the second charging coil are positioned adjacent to the top side of the main section in the first level along the plane and interior to where the first side section and the second side section are adjacent to the top side of the main section, a portion of the first charging coil is adjacent to the bottom side of the first side section in the second section along the plane and a portion of the second charging coil is adjacent to the bottom side of the second side section the second section along the plane, wherein a signal injected in the first and second coils generates an electromagnetic field radiating in a direction away from the top side of the main section].

16. The apparatus of claim 15, wherein the offset is at least a thickness of one or more of the first charging coil and the second charging coil, the thickness measured in a direction perpendicular to the bottom side of one or more of the first side section and the second side section.

17. The apparatus of claim 15, wherein the portion of the first charging coil and the portion of the second charging coil adjacent to the top side of the main section are wound in a spiral pattern in [a] *the* plane parallel to the top side of the main section.

18. The apparatus of claim 15, wherein the ferrite structure comprises a first edge and a second edge, the first and second edges located distal to a plane bisecting the main section, the first side section and the second side section, the first charging coil and the second charging coil [extend] *extending* past the first and second edges of the ferrite structure.

19. A system for wireless power transfer, the system comprising:

a first charging coil comprising one or more conductors arranged in a first winding pattern;

a second charging coil comprising one or more conductors arranged in a second winding pattern;

a multi-level ferrite structure comprising a main section at a first level, the main section comprising a top side along a plane, a first side portion and second side portion, a first side section at a second level and a second side section at the second level, the first side section and the second side section each comprising a bottom side positioned along the plane, wherein the first side portion of the top side of the main section is adjacent to a portion of the bottom side of the first side section along the plane and the second side portion of the top side of the main section is adjacent to a portion of the bottom side of the second side section along the plane, and wherein a portion of the first charging coil and a portion of the second charging coil are positioned adjacent to the top side of the main section in the first level along the plane and interior to where the first side section and the second side section are adjacent to the top side of the main section, a portion of the first charging coil is adjacent to the bottom side of the first side section [in the second section] along the plane and a portion of the second charging coil is adjacent to the bottom side of the second side section [in the second section] along the plane, wherein a signal injected in the first and second *charging* coils generates an electromagnetic field radiating in a direction away from the top side of the main section; and an inverter connected to the first and second charging coils, the inverter injecting [a] *the* signal in the first and second charging coils, wherein the injected signal generates an electromagnetic field radiating in a direction away from the top side of the main section.

20. The system of claim 19, wherein the first charging coil, the second charging coil and the ferrite structure comprise a primary pad and further comprising a secondary pad magnetically coupled to the primary pad, the secondary pad converting energy from the electromagnetic field into electrical energy, and further comprising a secondary circuit connected to the secondary pad, wherein the secondary circuit receives the electrical energy from the secondary pad and conditions the electrical energy for use by a load.

*21. An apparatus comprising:*

*a multi-level ferrite structure comprising:*

*a main section comprising a top side along a plane;*

*a first side section; and*

*a second side section, a bottom side of the first and second side sections positioned along the plane,*

*wherein a portion of the bottom side of the first and second side sections are adjacent to the top side of the main section at opposite ends of the main section;*

*a first charging coil; and*

*a second charging coil,*

*wherein a portion of conductors of the first charging coil and the second charging coil are adjacent to the top side of the main section, a portion of the first charging coil is adjacent to the bottom side of the first side section along the plane, and a portion of the second charging coil is adjacent to the bottom side of the second side section,*

*wherein a signal injected in the first and second charging coils generates an electromagnetic field radiating in a direction away from the top side of the main section.*

*22. The apparatus of claim 21, wherein the main section is magnetically coupled to the first side section and to the second side section.*

*23. The apparatus of claim 21, further comprising a space between the portion of the first charging coil and the portion of the second charging coil located adjacent to the top side of the main section.*

*24. The apparatus of claim 21, wherein the main section, the first side section and the second side section of the ferrite structure are separate and wherein the top side of the main section is in contact with the bottom side of the first side section and with the bottom side of the second side section.*

*25. The apparatus of claim 24, wherein the portion of the first charging coil and the portion of the second charging coil adjacent to the top side of the main section are wound in a spiral pattern in a plane parallel to the top side of the main section.*

*26. The apparatus of claim 21, wherein the ferrite structure further comprises a plurality of notches, each notch accommodating a portion of one of the first charging coil and the second charging coil during a transition between the main section and one of the first side section and the second side section.*

*27. The apparatus of claim 21, wherein the portion of the first charging coil adjacent to the bottom side of the first side section is wound to group the one or more conductors in a pattern that minimizes one or more of conductor length and distance from a center point of the main section between the first charging coil and the second charging coil.*

*28. The apparatus of claim 21, the first charging coil is mirror image of the second charging coil.*

*29. The apparatus of claim 21, wherein the multi-level ferrite structure, first charging coil and second charging coil comprise a primary pad configured to wirelessly transfer power to secondary pad.*

*30. The apparatus of claim 29, wherein the primary pad is stationary and the secondary pad is on a vehicle and provides power to a battery that provides power to the vehicle.*

* * * * *